J. B. HIGHLAND.
FRICTION CLUTCH.
APPLICATION FILED MAR. 23, 1918.
1,291,883.
Patented Jan. 21, 1919.
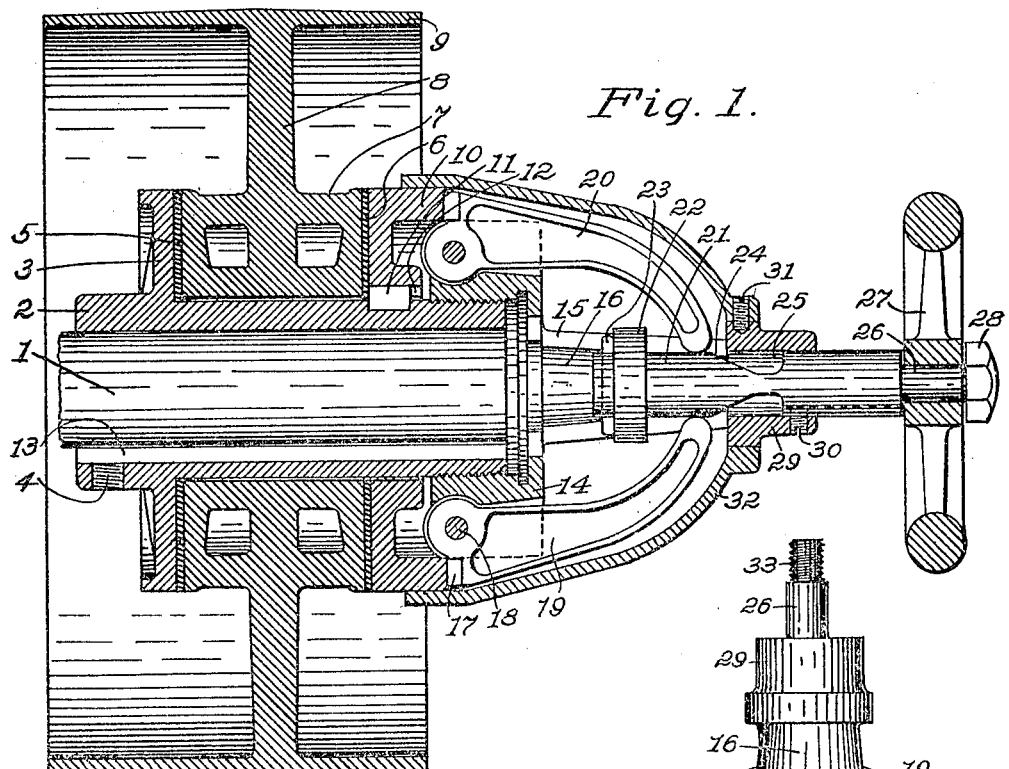
Fig. 1.
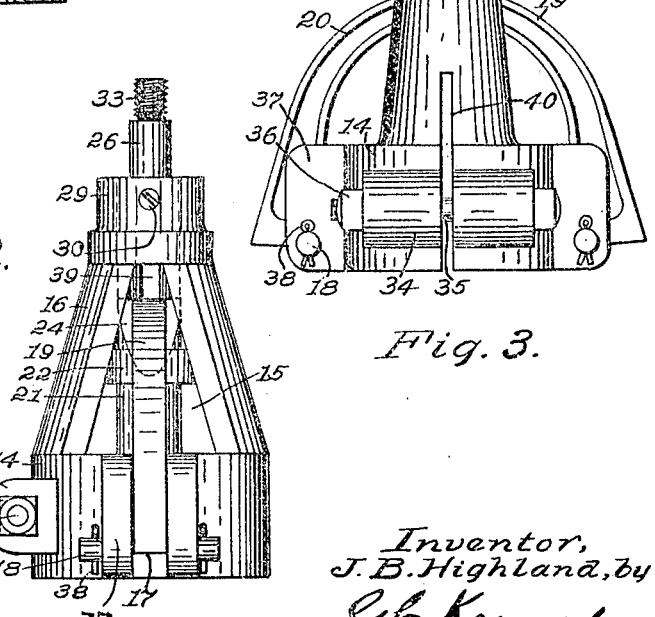
Fig. 2.
Fig. 3.
Witnesses:
Pearl Stanton
C. C. Lindner
Inventor,
J. B. Highland, by
G. C. Kennedy.
Attorney.

UNITED STATES PATENT OFFICE.

JACOB B. HIGHLAND, OF WATERLOO, IOWA, ASSIGNOR TO WATERLOO GASOLINE ENGINE COMPANY, OF WATERLOO, IOWA.

FRICTION-CLUTCH.

1,291,883. Specification of Letters Patent. Patented Jan. 21, 1919.

Application filed March 23, 1918. Serial No. 224,189.

*To all whom it may concern:*

Be it known that I, JACOB B. HIGHLAND, a citizen of the United States of America, and a resident of Waterloo, Blackhawk county, Iowa, have invented certain new and useful Improvements in Friction-Clutches, of which the following is a specification.

My invention relates to improvements in friction clutches, and the object of my improvement is to provide such a clutch with ready and effective means for shifting the clutch parts thereof into and out of operative position manually with provision for adjustment of said parts.

This object I have accomplished by the means which are hereinafter described and claimed, and which are illustrated in the accompanying drawings, in which:

Figure 1 is a longitudinal axial section of my said friction clutch operatively mounted upon the rotatable shaft, and showing the movable parts of the clutch shifted into engaging position with a belt wheel mounted upon the shaft.

Fig. 2 is a detail elevation of a hollow guide body and the movable parts mounted thereon.

Fig. 3 is another elevation of the part shown in said Fig. 2, but taken at an angle of 90 degrees therewith.

Similar numerals of reference denote corresponding parts throughout the several views.

Referring first to Fig. 1, the numeral 1 denotes the rotatable shaft, upon one end of which a sleeve 2 is splined on a key 13, and the sleeve is prevented from rotation relative to said shaft by means of a set screw 4. Said sleeve is provided near its left hand end with an annular integral circumferential flange 3. A belt wheel 9 has its rim mounted on spokes 8 extending from a thickened hub 7, whose opposite faces are at right angles to the shaft 1, said hub being mounted loosely and slidably upon the sleeve 2, with a friction ring 5 made of fiber or other suitable material seated about said sleeve between said hub and said flange. Fiber friction ring 6 is seated about said sleeve to abut upon the opposite face of the said hub, and a collar 10 is mounted slidably but non-rotatably upon said sleeve by means of a key 11 seated in its longitudinal key-seat 12. Said parts are so formed and located that when said collar 10 is moved to the left, it will compress the hub 7 of said belt wheel, also the friction rings 5 and 6 between itself and the relatively fixed flange 3 and thereby cause said belt wheel, when in rotation, to rotate said shaft.

My improved means for pushing said collar into operative engagement with the other parts heretofore described are the following:

A hollow guide body 14 of a cylindrical shape is interiorly threaded to be detachably and longitudinally adjustably seated upon the exteriorly threaded right hand end of the sleeve 2. The said body has its part which projects to the right hand in line with said shaft 1 made in the form of a truncated cone at 16, oppositely slotted at 15, and terminating with a cylindrical part 29 having a central longitudinal bore in line with said shaft and adapted to slidably receive the cylindrical slide body 21, whose right hand end projects beyond the right hand end of said part 29, but is prevented from rotation relative to said part by means of a set screw 30 passed through said part into a longitudinal key way in said slide.

The numeral 22 denotes a ring shaped part of the body part 16, which is adapted to slidably seat the inner end of said slide 21, and a key 23 is passed through a transverse orifice in the end of said slide to contact with the left hand end of said ring within said slots to prevent the slide from slipping out of its bearing. The numeral 24 denotes like transverse grooves on opposite sides of the slide body 21, and whose side walls nearest the end of the shaft are sloped convergingly while the opposite walls of the grooves are formed to extend at an abrupt angle with the axis of the slide.

The numeral 37 denotes pairs of spaced lugs integral with the body 14 and extending outwardly from opposite sides thereof and connected by means of the pintles 18, which latter are secured by means of split keys 38. On these pintles are pivotally mounted like ends of the fingers 19 and 20, which latter have integral projections 17 abutting upon the adjacent end of the collar 10. The other ends of said fingers are bent convergingly to lie in movable contact with opposite sides of the slide 21 so as to drop into transverse grooves 24—25 when the slide is moved in one direction. The outer end of the slide 21 is diminished and threaded at the outer end to seat a nut 28, and the hand wheel 27 is loosely mounted on said diminished end 26. A hollow guard 32 is secured about the movable fingers 19 and 20 by means of a set screw 31 engaging the part 29 of the hollow body 14. One side of the said hollow body has a dividing split or longitudinal opening 40, the said body having integral lugs 34 on opposite sides of the said grooves transversely orificed in line to seat the bolt 35 which is secured by means of a nut 36. Said bolt is adapted to draw together the said lugs slightly to cause the said body at those parts to adjustably fit the other parts upon which it is seated.

The collar 10 is pushed into engagement to cause the belt wheel 9 to be secured to the sleeve 2 by simply pulling outwardly the slide 21 by means of said hand wheel 27, which causes the ends of the fingers 19 and 20 to ride upon the sloping faces 24 of the transverse grooves therein, and causing the projections 17 to press upon said collar forcing it to the left. To disengage the belt wheel, it is only necessary to push the slide to the left when the ends of the fingers 19 and 20 drop into said transverse grooves and disengage the projections 17 from said collar 10.

Having described my invention, what I claim as new, and desire to secure by Letters Patent, is:

1. A friction-clutch, comprising a sleeve non-rotatably non-slidably mounted on a rotatable shaft, and having a circumferential annular flange, a belt wheel mounted slidably and loosely on said sleeve and having a hub, one end of which abuts upon said circumferential flange, a collar mounted slidably non-rotatably upon said sleeve to abut upon the opposite end of said hub, a hollow body mounted detachably upon the end of said sleeve adjacent to said collar, projecting in alinement beyond the end of the rotatable shaft and having longitudinal slots in opposite sides, a slide mounted in the hollow of said body to slide longitudinally therein, said slide having transverse grooves on opposite sides facing the slots in said hollow body, said grooves having their walls nearest the shaft end sloped convergingly with their opposite walls at abrupt angles to the axis of the slide, fingers pivoted at one end of each to said hollow body and bent toward each other to have their other ends extended through its slots to contact movably with the grooved sides of said slide, each finger having a projection extending outwardly from its pivoted end and adapted to engage said collar to push it and the hub of said belt wheel slidingly into frictional engagement with the flange on said sleeve when the said slide is moved out of said hollow body to lift the finger ends out of the transverse grooves of the slide.

2. A friction-clutch, comprising a sleeve non-rotatably non-slidably mounted on a rotatable shaft, and having a circumferential annular flange, a belt wheel mounted slidably and loosely on said sleeve and having a hub, one end of which abuts upon said circumferential flange, a collar mounted slidably and non-rotatably on said sleeve to abut upon the opposite end of said hub, friction-rings mounted loosely between said hub and said flange and collar, a hollow body mounted detachably and adjustably along the end of said sleeve adjacent to said collar, and having longitudinal slots in opposite sides, a slide mounted in the hollow of said body to slide therein, said slide having transverse grooves on opposite sides facing said slots, with the walls of said grooves sloped convergingly toward the end of the slide, fingers pivoted to said hollow body and having their free ends inturned to ride upon the slide into said grooves, each finger having an integral projection located adjacent to said collar, and adapted to contact with and slide said collar to compress said wheel hub and friction rings between the collar and the flange on said sleeve.

3. A friction-clutch, comprising a belt wheel mounted slidably and rotatably on a rotatable shaft, means for limiting the slidable movement of said wheel in one direction along said shaft, a collar slidably, non-rotatably mounted on said shaft on the opposite side of said wheel from said limiting means and adapted to be moved into frictional engagement with said wheel, a hollow body detachably secured on the end of said shaft in alinement therewith and having like longitudinal slots on opposite sides, fingers pivoted at one end to said hollow body and having their other ends extending through said slots, a slide non-rotatably mounted in the hollow of said body and being grooved slopingly on opposite sides, the free ends of said fingers being movable into said groove when said slide is pushed inwardly into the hollow of said body, the said fingers having engaging means adapted to push said collar against said belt wheel when said fingers are thrust apart by the movement outward of said slide.

Signed at Waterloo, Iowa, this 7th day of March, 1918.

JACOB B. HIGHLAND.

Witnesses:
W. H. DANIEL,
G. C. KENNEDY.